(12) United States Patent
Oie et al.

(10) Patent No.: US 8,818,689 B2
(45) Date of Patent: Aug. 26, 2014

(54) CYLINDER INTAKE AIR AMOUNT CALCULATING APPARATUS FOR INTERNAL COMBUSTION ENGINE

(75) Inventors: Naoki Oie, Wako (JP); Toshinori Tsukamoto, Wako (JP); Todd Robert Luken, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 293 days.

(21) Appl. No.: 12/974,726

(22) Filed: Dec. 21, 2010

(65) Prior Publication Data

US 2011/0172896 A1 Jul. 14, 2011

(30) Foreign Application Priority Data

Jan. 12, 2010 (JP) .................................. 2010-3542

(51) Int. Cl.
F02D 28/00 (2006.01)
(52) U.S. Cl.
USPC ......... 701/103; 123/399; 73/114.32; 701/104
(58) Field of Classification Search
CPC . F02D 41/0002; F02D 41/1401; F02D 41/18; F02D 2041/141; F02D 2041/1433; F02D 2200/0402; F02D 2200/0411; Y02T 10/42
USPC .............. 73/114.02, 114.32, 114.33, 118.02; 701/102–104, 106, 114, 115; 123/336, 123/399, 403, 442, 478, 480, 494
See application file for complete search history.

(56) References Cited

U.S. PATENT DOCUMENTS

| 5,003,950 | A | * | 4/1991 | Kato et al. ............... 123/406.46 |
| 5,069,184 | A | * | 12/1991 | Kato et al. ............... 123/406.46 |
| 5,357,932 | A | * | 10/1994 | Clinton et al. ................ 123/488 |
| 5,497,329 | A | * | 3/1996 | Tang ............................. 701/104 |
| 6,032,656 | A | | 3/2000 | Itoyama et al. |
| 6,089,082 | A | * | 7/2000 | Kotwicki et al. .......... 73/114.32 |
| 6,170,475 | B1 | * | 1/2001 | Lewis et al. .............. 123/568.21 |

(Continued)

FOREIGN PATENT DOCUMENTS

| EP | 1 505 283 A1 | 2/2005 |
| JP | 2-157452 A | 6/1990 |
| JP | 2998260 B2 * | 1/2000 |

OTHER PUBLICATIONS

Alexander Stotsky et al., "Application of input estimation techniques to charge estimation and control in automotive engines", Dec. 1, 2002, Control Engineering Practice, Pergamon Press Oxford, GB, pp. 1371-1383.

Primary Examiner — Mahmoud Gimie
Assistant Examiner — John Zaleskas
(74) Attorney, Agent, or Firm — Arent Fox LLP (57) ABSTRACT

A cylinder intake air amount calculating apparatus for an internal combustion engine that calculates a cylinder intake air amount, which is an amount of fresh air sucked in a cylinder of the engine using an intake air pipe model equation which is obtained by modeling an intake pipe of the engine, is provided. An intake air flow rate is obtained. The cylinder intake air amount is calculated by applying the intake air flow rate and a preceding value of the cylinder intake air amount to the intake pipe model equation. A predicted intake air flow rate which is a predicted value of the intake air flow rate is calculated. A predicted cylinder intake air amount which is a predicted value of the cylinder intake air amount is calculated by applying the predicted intake air flow rate and the cylinder intake air amount to the intake pipe model equation.

8 Claims, 7 Drawing Sheets

(56) References Cited

U.S. PATENT DOCUMENTS

| | | | |
|---|---|---|---|
| 6,230,697 B1 * | 5/2001 | Itoyama et al. | 123/568.21 |
| 6,298,299 B1 * | 10/2001 | Itoyama et al. | 701/101 |
| 6,363,316 B1 * | 3/2002 | Soliman et al. | 701/104 |
| 6,460,409 B1 * | 10/2002 | Soliman et al. | 73/114.72 |
| 6,497,214 B2 * | 12/2002 | Yagi | 123/399 |
| 6,502,563 B2 * | 1/2003 | Itoyama | 123/568.21 |
| 6,636,796 B2 * | 10/2003 | Kolmanovsky et al. | 701/104 |
| 6,640,622 B2 * | 11/2003 | Soliman et al. | 73/114.32 |
| 7,010,413 B2 * | 3/2006 | Dudek et al. | 701/102 |
| 7,107,978 B2 * | 9/2006 | Itoyama | 123/683 |
| 7,200,486 B2 * | 4/2007 | Tanaka et al. | 701/109 |
| 7,441,544 B2 * | 10/2008 | Hagari | 123/434 |
| 2002/0078924 A1 * | 6/2002 | Yagi | 123/399 |
| 2002/0107630 A1 | 8/2002 | Yagi | |
| 2002/0133286 A1 * | 9/2002 | Kolmanovsky et al. | 701/104 |
| 2003/0220732 A1 * | 11/2003 | Matthews et al. | 701/103 |
| 2006/0037596 A1 * | 2/2006 | Fuwa | 123/681 |
| 2006/0080024 A1 * | 4/2006 | Abe et al. | 701/104 |
| 2008/0121211 A1 * | 5/2008 | Livshiz et al. | 123/349 |

* cited by examiner

CYLINDER INTAKE AIR AMOUNT CALCULATING APPARATUS FOR INTERNAL COMBUSTION ENGINE

BACKGROUND OF THE INVENTION

1. Field of the Invention

The present invention relates to a cylinder intake air amount calculating apparatus for calculating a cylinder intake air amount which is an amount of fresh air sucked in a cylinder of an internal combustion engine.

2. Description of the Related Art

Japanese patent laid-open No. H2-157452 (JP'452) discloses a fuel injection amount control apparatus which calculates a predicted value of the cylinder intake air amount of an internal combustion engine, and calculates a fuel injection amount based on the calculated predicted value. According to this apparatus, a preceding predicted value of the cylinder intake air amount and the detected intake air flow rate are applied to a physical model equation which is set based on the mass-conservation law of the intake air, to calculate a present predicted value of the cylinder intake air amount, and the fuel injection amount is calculated based on the present predicted value. By using the predicted value, accuracy of the air-fuel ratio control is improved in the transient operating condition of the engine.

The predicted value naturally includes a prediction error. Therefore, it is desired that the method of JP'452 in which the predicted value of the cylinder intake air amount is calculated using the preceding predicted value, may be further improved in calculation accuracy of the predicted value.

SUMMARY OF THE INVENTION

The present invention is made contemplating the above-described point, and an objective of the invention is to provide a cylinder intake air amount calculating apparatus which can calculate the predicted value of the cylinder intake air amount of an internal combustion engine with higher accuracy.

To attain the above objective, the present invention provides a cylinder intake air amount calculating apparatus for an internal combustion engine which calculates a cylinder intake air amount (GAIRCYLN) which is an amount of fresh air sucked in a cylinder of the engine using an intake air pipe model equation which is obtained by modeling an intake pipe (2) of the engine, The cylinder intake air amount calculating apparatus includes intake air flow rate obtaining means, cylinder intake air amount calculating means, intake air flow rate predicting means, and cylinder intake air amount predicting means. The intake air flow rate obtaining means obtains an intake air flow rate (HGAIRTH, GAIRTH) which is a flow rate of fresh air passing through the intake pipe (2) of the engine. The cylinder intake air amount calculating means calculates the cylinder intake air amount (GAIRCYLN(k)) by applying the intake air flow rate (HGAIRTH, GAIRTH) and a preceding value (GAIRCYLN(k−1)) of the cylinder intake air amount to the intake pipe model equation. The intake air flow rate predicting means calculates a predicted intake air flow rate (HGAIRTHP) which is a predicted value of the intake air flow rate. The cylinder intake air amount predicting means calculates a predicted cylinder intake air amount (GAIRCYLNP) which is a predicted value of the cylinder intake air amount by applying the predicted intake air flow rate (HGAIRTHP) and the cylinder intake air amount (GAIRCYLN(k)) to the intake pipe model equation.

With this configuration, the intake air flow rate which is a flow rate of fresh air passing through the intake pipe of the engine is obtained, and the cylinder intake air amount is calculated by applying the intake air flow rate and the preceding value of the cylinder intake air amount to the intake pipe model equation. Further, the predicted intake air flow rate which is a predicted value of the intake air flow rate is calculated, and the predicted cylinder intake air amount is calculated by applying the predicted intake air flow rate and the cylinder intake air amount to the intake pipe model equation. That is, the predicted cylinder intake air amount is calculated using the latest value of the calculated cylinder intake air amount. Accordingly, the predicted cylinder intake air amount can be calculated with higher accuracy as compared with the prior art using the preceding value.

Preferably, the intake pipe model equation includes a volumetric efficiency ($\eta v$) of the engine, and the cylinder intake air amount calculating apparatus further includes volumetric efficiency calculating means for calculating the volumetric efficiency ($\eta v$) using the preceding value (GAIRCYLN(k−1)) of the cylinder intake air amount.

With this configuration, the volumetric efficiency of the engine is calculated using the preceding value of the cylinder intake air amount, and the cylinder intake air amount and the predicted cylinder intake air amount are calculated using the calculated volumetric efficiency. Accordingly, an accurate value of the cylinder intake air amount can always be obtained without the influence of aging changes in the engine characteristic, since the volumetric efficiency is calculated using the calculated cylinder intake air amount.

Preferably, the volumetric efficiency calculating means at least once updates the volumetric efficiency ($\eta v(i)$) using the cylinder intake air amount calculated by the cylinder intake air amount calculating means, as the preceding value (GAIRCYLN(i−1)), and the cylinder intake air amount calculating means at least once updates the cylinder intake air amount (GAIRCYLN(i)) using the updated volumetric efficiency ($\eta v(i)$).

With this configuration, the volumetric efficiency is at least once updated using the cylinder intake air amount calculated by the cylinder intake air amount calculating means, as the preceding value, and the cylinder intake air amount is at least once updated using the updated volumetric efficiency. Therefore, accurate values of the volumetric efficiency and the cylinder intake air amount can be obtained in the transient engine operating condition ("accurate values" means that the obtained value is very close to the true value).

DETAILED DESCRIPTION OF THE PREFERRED EMBODIMENTS

Preferred embodiments of the present invention will now be described with reference to the drawings.

Figure 1:
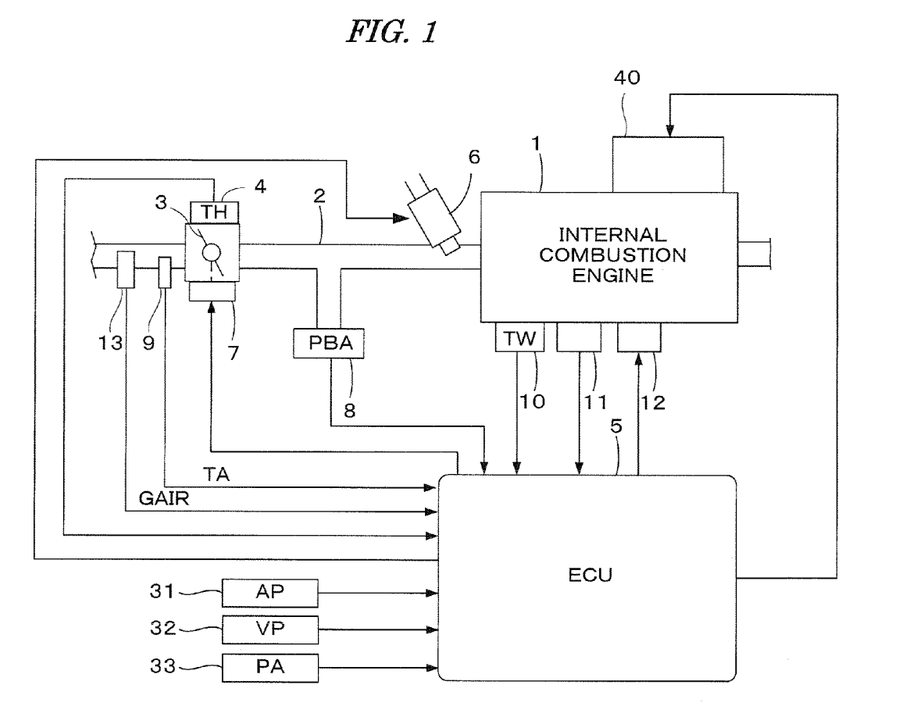
FIG. 1 is a schematic diagram showing a configuration of an internal combustion engine and a control system therefor according to one embodiment of the present invention.

FIG. 1 is a schematic diagram showing a configuration of an internal combustion engine and a control system therefor according to one embodiment of the present invention. In FIG. 1, the internal combustion engine (hereinafter referred to as "engine") 1 having, for example, four cylinders is provided with a valve operating characteristic varying mechanism 40 which continuously varies an operating phase of intake valves.

The engine 1 has an intake pipe 2 provided with a throttle valve 3. A throttle valve opening sensor 4 for detecting an opening TH of the throttle valve 3 is connected to the throttle valve 3. The throttle valve opening sensor 4 outputs an electrical signal corresponding to an opening of the throttle valve 3, and supplies the electrical signal to an electronic control unit (referred to as "ECU") 5. An actuator 7 for actuating the throttle valve 3 is connected to the throttle valve 3, and the operation of the actuator 7 is controlled by the ECU 5.

An intake air flow rate sensor 13 is disposed in the intake pipe 2 for detecting an intake air flow rate GAIR which is a flow rate of air (fresh air) sucked into the engine 1 through the throttle valve 3. Further, an intake air temperature sensor 9 for detecting an intake air temperature TA is disposed upstream of the throttle valve 3. The detection signals of these sensors 13 and 9 are supplied to the ECU 5.

Fuel injection valves 6 are inserted into the intake pipe 2 at locations intermediate between the cylinder block of the engine 1 and the throttle valves 3 and slightly upstream of the respective intake valves (not shown). These fuel injection valves 6 are connected to a fuel pump (not shown), and electrically connected to the ECU 5. A valve opening period of each fuel injection valve 6 is controlled by a signal output from the ECU 5.

A spark plug 12 of each cylinder of the engine 1 is connected to the ECU 5. The ECU 5 supplies an ignition signal to each spark plug 15 and controls the ignition timing.

An intake pressure sensor 8 for detecting an intake pressure PBA is disposed downstream of the throttle valve 3. Further, an engine coolant temperature sensor 10 for detecting an engine coolant temperature TW is mounted on the body of the engine 1. The detection signals from these sensors are supplied to the ECU 5.

A crank angle position sensor 11 is connected to the ECU 5. The crank angle position sensor 11 is provided to detect a rotational angle of a crankshaft (not shown) of the engine 1, and a signal corresponding to the rotational angle detected by the crank angle position sensor 11 is supplied to the ECU 5. The crank angle position sensor 11 includes a cylinder discrimination sensor which outputs a pulse (hereinafter referred to as "CYL pulse") at a predetermined angle position of a specific cylinder of the engine 1. The crank angle position sensor can also include a TDC sensor which outputs a TDC pulse at a crank angle position of a predetermined crank angle before a top dead center (TDC) starting an intake stroke in each cylinder (i.e., at every 180 degrees crank angle in a four-cylinder engine) and a CRK sensor for generating a CRK pulse with a crank angle period (e.g., period of 6 degrees, shorter than the period of generation of the TDC pulse) The CYL pulse, the TDC pulse, and the CRK pulse are supplied to the ECU 5. The CYL pulse, the TDC pulse, and the CRK pulse are used to control various timings, such as the fuel injection timing and the ignition timing, and to detect an engine rotational speed NE.

An accelerator sensor 31, a vehicle speed sensor 32, and an atmospheric pressure sensor 33 are also connected to the ECU 5. The accelerator sensor 31 detects a depression amount AP of an accelerator pedal of the vehicle driven by the engine 1 (the depression amount will be hereinafter referred to as "accelerator operation amount"). The vehicle speed sensor 32 detects a running speed (vehicle speed) VP of the vehicle. The atmospheric pressure sensor 33 detects an atmospheric pressure PA. The detection signals from these sensors are supplied to the ECU 5.

The engine 1 is provided with an exhaust gas recirculation mechanism (not shown), exhaust gases of the engine 1 are recirculated to the intake pipe 2 on the downstream side of the throttle valve 3.

The ECU 5 includes an input circuit having various functions including a function of shaping the waveforms of the input signals from the various sensors, a function of correcting the voltage level of the input signals to a predetermined level, and a function of converting analog signal values into digital signal values. The ECU 5 may further include a central processing unit (hereinafter referred to as "CPU"), a memory circuit, and an output circuit. The memory circuit preliminarily stores various operating programs to be executed by the CPU and the results of computation or the like by the CPU. The output circuit supplies drive signals to the actuator 7, the fuel injection valves 6, and the valve operating characteristic varying mechanism 40.

The CPU in the ECU 5 controls an ignition timing, an opening of the throttle valve 3, an amount of fuel to be supplied to the engine 1 (the opening period of each fuel injection valve 6), and an operating phase of the intake valves according to the detection signals from the above-described sensors.

Further, the CPU in the ECU 5 calculates an estimated value HGAIRTH of a flow rate of air passing through the throttle valve 3 (hereinafter referred to as "estimated throttle valve passing air flow rate HGAIRTH"), and further calculates a cylinder intake air amount GAIRCYLN [g/TDC] (an amount of air per TDC period, i.e., a time period during which the crankshaft of the engine 1 rotates 180 degrees if the engine 1 has four cylinders), based on the estimated throttle valve passing air flow rate HGAIRTH, the intake pressure PBA, and the intake air temperature TA. Further, the CPU in the ECU 5 calculates a predicted value HGAIRTHP of the flow rate of air passing through the throttle valve 3 after one stroke period (hereinafter referred to as "predicted throttle valve passing air flow rate HGAIRTHP"), and further calculates a predicted value GAIRCYLP of the cylinder intake air amount GAIRCYLN after one stroke period (hereinafter referred to as "predicted cylinder intake air amount GAIRCYLN") using the predicted throttle valve passing air flow rate HGAIRTHP and the cylinder intake air amount GAIECYLN. The calculated predicted cylinder intake air amount GAIRCYLN is applied to the fuel supply amount control and the ignition timing control.

The calculation method of the estimated throttle valve passing air flow rate HGAIRTH, the predicted throttle valve passing air flow rate HGAIRTHP, the cylinder intake air amount GAIRCYLN, and the predicted cylinder intake air amount GAIRCYLP, is specifically described below.

Figure 2:
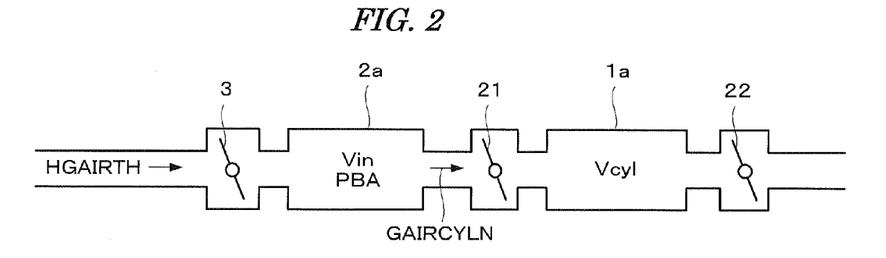
FIG. 2 is a schematic diagram of the engine shown in FIG. 1.

FIG. 2 shows a schematic diagram of the engine 1. In FIG. 2, an intake valve 21, an exhaust valve 22, and a cylinder 1a are shown. A change amount DGAIRIN indicative of a change in the air amount in the portion 2a of the intake pipe 2 (i.e., the downstream of the throttle valve), is given by the following equation (1). In the equation (1), Vin is a volume of the portion 2a, TAK is an absolute temperature converted from the intake air temperature TA, R is the gas constant, and DPA is a change amount (PBA(k)−PBA(k−1)) of the intake pressure PBA. Further, "k" is a discrete time digitized with the TDC period (the period corresponding to one stroke).

$$DGAIRIN = Vin \times DPBA/(R \times TAK) \quad (1)$$

Accordingly, a difference between the estimated throttle valve passing air flow rate HGAIRTH [g/TDC] and the cylinder intake air amount GAIRCYLN [g/TDC] is equal to the change amount DGAIRIN as shown by the following equation (2).

$$DGAIRIN = HGAIRTH(k) - GAIRCYLN(k-1) \quad (2)$$

On the other hand, the cylinder intake air amount GAIRCYLN is given by the following equation (3). In the equation (3), Vcyl is a cylinder volume, and $\eta v$ is a volumetric efficiency.

$$GAIRCYLN = Vcyl \times \eta v \times PBA/(R \times TAK) \quad (3)$$

By using the equation (3), the intake pressure change amount DPBA is given by the following equation (4). Further, by applying the DPBA given by the equation (4) and the relationship of the equation (2), the following equation (5) (the intake pipe model equation) is obtained.

$$DPBA = PBA(k) - PBA(k-1) \quad (4)$$
$$= \frac{(GAIRCYLN(k) - GAIRCYLN(k-1)) \times R \times TAK}{Vcyl \times \eta v}$$

$$GAIRCYLN(k) = \left(1 - \frac{Vcyl \times \eta v}{Vin}\right) \times GAIRCYLN(k-1) + \frac{Vcyl \times \eta v}{Vin} \times HGAIRTH(k) \quad (5)$$

Accordingly, the equation (5) is expressed by the following equation (5a) using a delay coefficient CGAIRCYLN defined by the following equation (6). That is, the cylinder intake air amount GAIRCYLN can be calculated using the first-order delay model equation whose input is the estimated throttle valve passing air flow rate HGAIRTH.

$$CGAIRCYLN = Vcyl \times \eta v/Vin \quad (6)$$

$$GAIRCYLN(k) = (1 - CGAIRCYLN) \times GAIRCYLN(k-1) + CGAIRCYLN \times HGAIRTH(k) \quad (5a)$$

Figure 3:
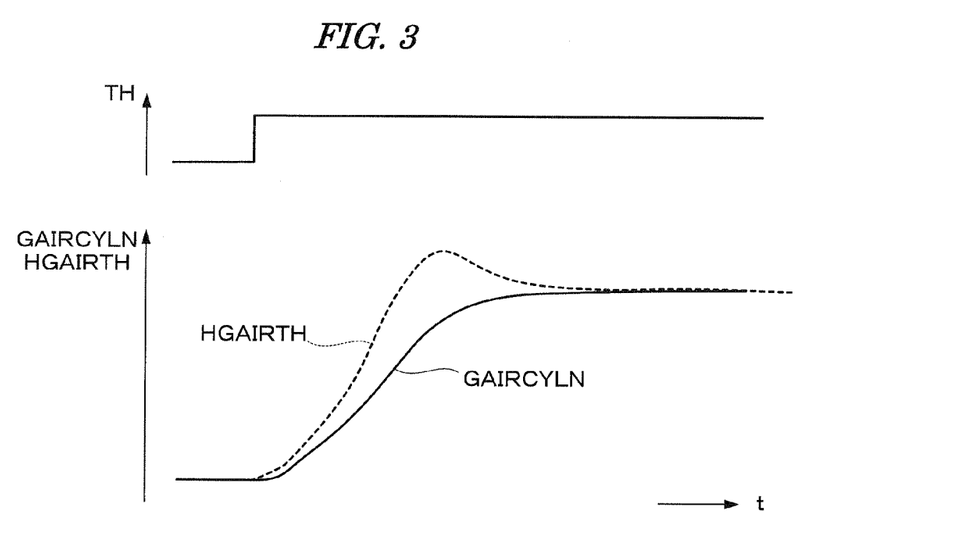
FIG. 3 shows time charts illustrating changes in an estimated throttle valve passing air flow rate (HGAIRTH) and a cylinder intake air amount (GAIRCYLN) when the throttle vale is opened.

FIG. 3 shows changes in the estimated throttle valve passing air flow rate HGAIRTH (dotted line) and the cylinder intake air amount GAIRCYLN (solid line) when the throttle valve is rapidly opened. It is confirmed that the cylinder intake air amount GAIRCYLN can be approximated by the equation (5a).

In order to calculate the delay coefficient CGAIRCYLN with the equation (6), it is necessary to calculate the volumetric efficiency $\eta v$. The volumetric efficiency $\eta v$ changes depending on the engine operating condition (the engine rotational speed NE, the intake pressure PBA), the operating phase of the intake valve, the exhaust gas recirculation rate, and the like. Therefore, in the present embodiment, the volumetric efficiency $\eta v$ used in calculation of the cylinder intake air amount GAIRCYLN is calculated by the following equation (7).

$$\eta v = GAIRCYLN(k-1)/GAIRSTD(k) \quad (7)$$

GAIRSTD(k) in the equation (7) is a theoretical cylinder intake air amount calculated by the following equation (8).

$$GAIRSTD(k) = PBA(k) \times Vcyl/(R \times TAK) \quad (8)$$

By using the equation (7), it is possible to calculate the volumetric efficiency $\eta v$ without using maps or tables, and to obtain an optimum value without the influence of aging changes in the engine characteristic since the volumetric efficiency $\eta v$ is always updated.

Figure 4:
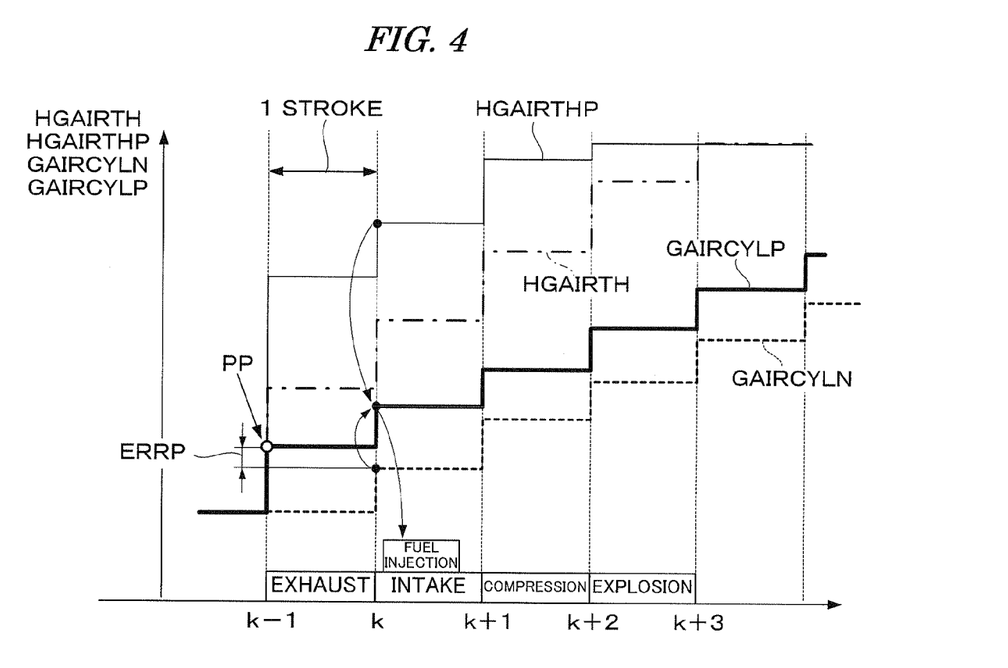
FIG. 4 is a time chart for illustrating a calculation method of a predicted cylinder intake air amount (GAIRCYLP)

FIG. 4 is a time chart for explaining the calculation method of the predicted cylinder intake air amount GAIRCYLP in this embodiment.

The chain line and the thin solid line respectively indicate changes in the estimated throttle valve passing air flow rate HGAIRTH and the predicted throttle valve passing air flow rate HGAIRTHP, and the dashed line and the thick solid line respectively indicate changes in the cylinder intake air amount GAIRCYLN and the predicted cylinder intake air amount GAIRCYLP.

In this embodiment, the predicted throttle valve passing air flow rate HGAIRTHP is calculated based on the estimated throttle valve passing air flow rate HGAIRTH, and the predicted cylinder intake air amount GAIRCYLP(k) at time k is calculated using the predicted throttle valve passing air flow rate HGAIRTHP(k) at time k and the cylinder intake air amount GAIRCYLN(k) at time k. The predicted cylinder intake air amount GAIRCYLP(k) indicates a predicted value of the cylinder intake air amount at time (k+1).

According to the conventional method wherein the predicted cylinder intake air amount GAIRCYLP(k) is calculated using the preceding value (the value corresponding to the point PP in FIG. 4) of the predicted cylinder intake air amount GAIRCYLP, the preceding value GAIRCYLP(k−1) includes a prediction error ERRP. In contrast, according to this embodiment, the predicted cylinder intake air amount GAIRCYLP(k) is calculated using the cylinder intake air amount GAIRCYLN(k) which does not include the prediction error ERRP. Consequently, calculation accuracy of the predicted cylinder intake air amount GAIRCYLP(k) can be improved.

Since the fuel injection is performed in the intake stroke as shown in FIG. 4, the fuel can be supplied by an amount suitable for an actual cylinder intake air amount (the air amount estimated to be substantially equal to GAIRCYLN (k+1)) by calculating the fuel injection amount based on the predicted cylinder intake air amount GAIRCYLP(k), which improves the air-fuel ratio control accuracy in a transient operating condition. The cylinder intake air amount GAIRCYLN(k) calculated at time k indicates an amount of air sucked in one stroke period immediately before time k. Accordingly, the cylinder intake air amount GAIRCYLN(k) takes a value smaller than the actual intake air amount in the accelerating condition illustrated in FIG. 4.

Figure 5:
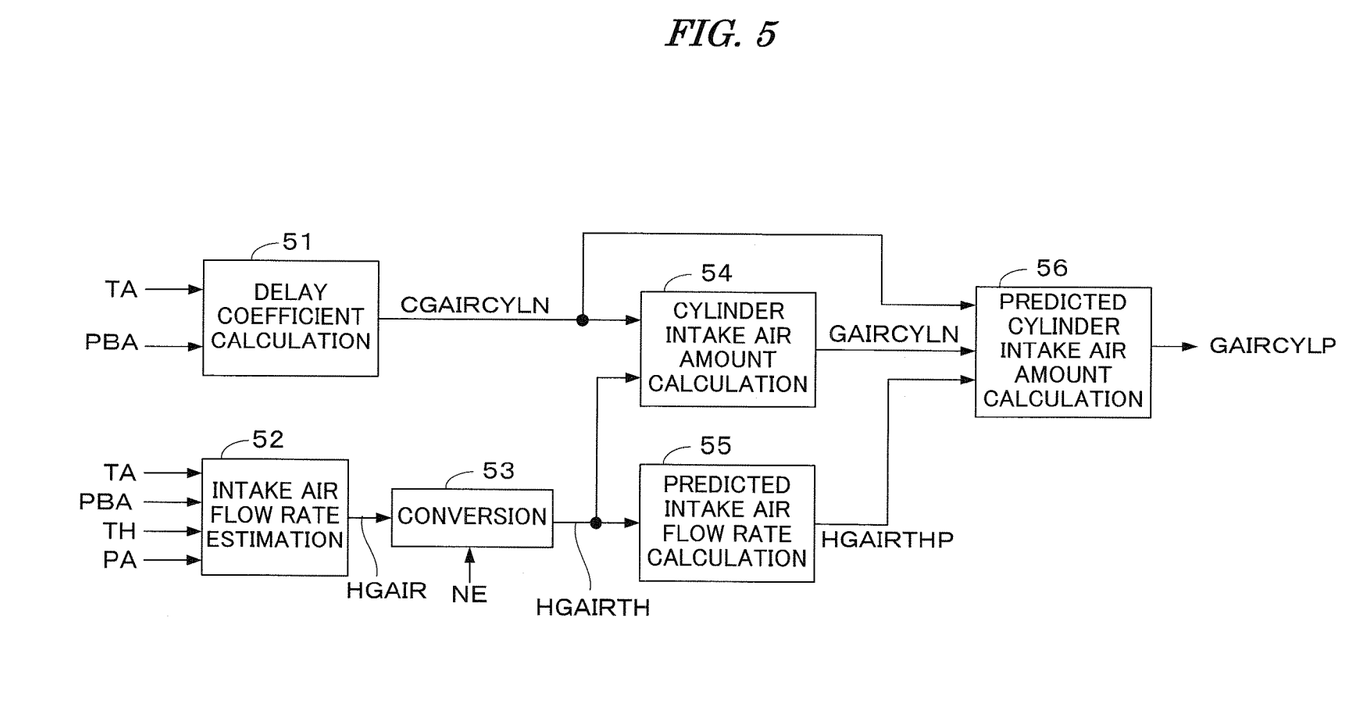
FIG. 5 is a block diagram showing a configuration of a module for calculating the predicted cylinder intake air amount (GAIRCYLP)

FIG. 5 is a block diagram showing a configuration of the predicted cylinder intake air amount calculation module for calculating the predicted cylinder intake air amount GAIRCYLP with the above-described method. The function of this module is actually realized by the calculation process executed by the CPU in the ECU 5.

The predicted cylinder intake air amount calculation module shown in FIG. 5 includes a delay coefficient calculation block 51, an intake air flow rate estimation block 52, a conversion block 53, a cylinder intake air amount calculation block 54, a predicted intake air flow rate calculation block 55, and a predicted cylinder intake air amount calculation block 56.

The delay coefficient calculation block 51 calculates the delay coefficient CGAIRCYLN using the above-described equations (6)-(8).

Figure 6A:
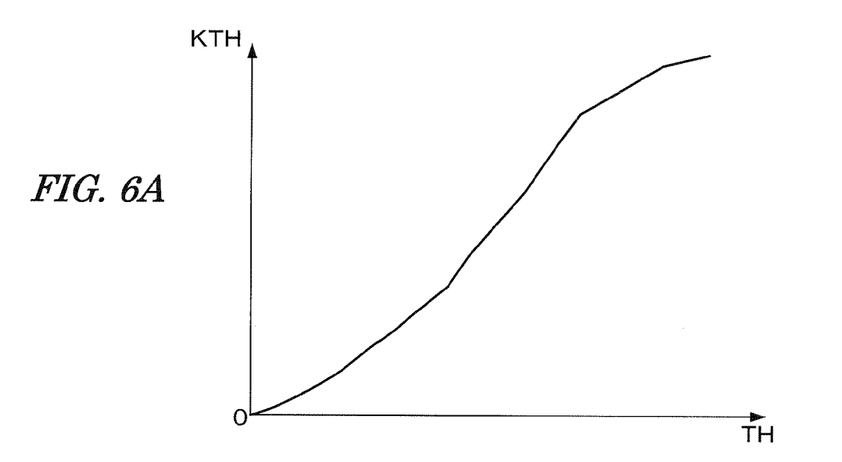
FIGS. 6A and 6B show tables used for calculating an estimated intake air flow rate (HGAIR)
Figure 6B:
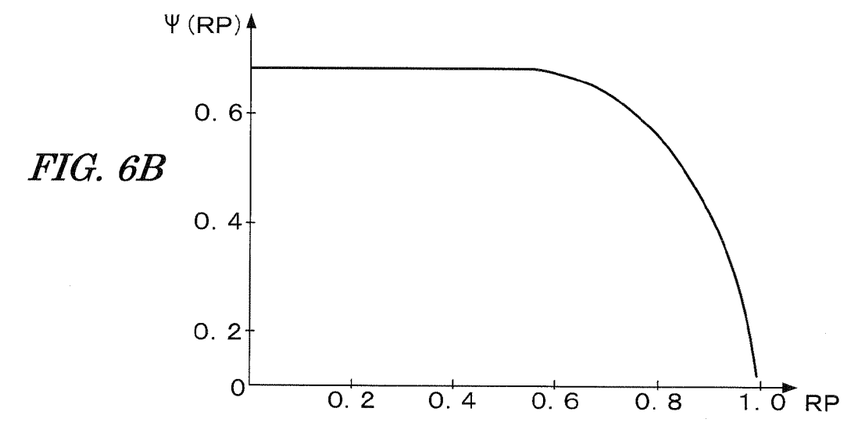

The intake air flow rate estimation block 52 calculates, with the following equation (11), an estimated intake air flow rate HGAIR which is an estimated value of the intake air flow rate GAIR, according to the intake air temperature TA, the intake pressure PBA, the throttle valve opening TH, and the atmospheric pressure PA. In the equation (11), KC is a conversion constant for converting the dimension of the flow rate to [g/sec]; KTH(TH) is an open area flow rate function calculated according to the throttle valve opening TH; Ψ (RP) is a pressure ratio flow rate function calculated according to a ratio RP (=PBA/PA) of the intake pressure PBA indicative of a pressure on the downstream side of the throttle valve 3, with respect to the atmospheric pressure PA indicative of a pressure on the upstream side of the throttle valve 3; and R is the gas constant. A value of the opening area flow rate function KTH(TH) is calculated using the KTH table shown in FIG. 6(a) which is previously set with experiment. The pressure ratio flow rate function Ψ is given by the following equation (12). In the equation (12), "κ" is the specific heat of air. However, the pressure ratio flow rate function Ψ takes a local maximum value regardless of the pressure ratio if the air flow rate exceeds the acoustic velocity. Accordingly, in the actual calculation process, the value of the pressure ratio flow rate function Ψ (RP) is also calculated using Ψ (RP) table (FIG. 6(b)) which is previously set.

$$HGAIR = \frac{KC \times PA \times KTH(TH) \times \psi(RP)}{\sqrt{R \times (273 + TA)}} \quad (11)$$

$$\psi(RP) = \sqrt{\frac{2\kappa}{\kappa-1}\left\{RP^{\frac{2}{\kappa}} - \left(\frac{1}{RP}\right)^{\frac{\kappa+1}{\kappa}}\right\}} \quad (12)$$

The conversion block 53 applies the estimated intake air flow rate HGAIR [g/sec] and the engine rotational speed NE to the following equation (13), to calculate the estimated throttle valve passing air flow rate HGAIRTH [g/TDC]. In the equation (12), KCV is a conversion coefficient.

$$HGAIRTH = HGAIR \times KCV/NE \quad (13)$$

The cylinder intake air amount calculation block 54 calculates the cylinder intake air amount GAIRCYLN using the above described equation (5a).

The equation (5a) is a recursive equation, and the equation (7) for calculating the volumetric efficiency ηv uses a preceding calculated value of the cylinder intake air amount GAIRCYLN. Therefore, it is necessary to set an initial value GAIRCYLNINI of the cylinder intake air amount GAIRCYLN. In this embodiment, the initial value GAIRCYLNINI is set with the following equation (14) to the theoretical cylinder intake air amount GAIRSTD. Accordingly, the initial value of the volumetric efficiency ηv is equal to "1" (refer to the equation (7)).

$$GAIRCYLNINI = GAIRSTD \quad (14)$$
$$= PBA \times Vcyl/(R \times TAK)$$

The predicted intake air flow rate calculation block 55 calculates the predicted throttle valve passing air flow rate HGAIRTHP(k) by the following equation (15). In the equation (15), KP is a predetermined prediction gain which is empirically set.

$$HGAIRTHP(k) = HGAIRTH(k) + \{HGAIRTH(k) - HGAIRTH(k-1)\} \times KP \quad (15)$$

The predicted cylinder intake air amount calculation block 56 calculates the predicted cylinder intake air amount GAIRCYLP(k) by the following equation (16). The equation (16) is an intake pipe model equation which is similar to the equation (5a), and is obtained by replacing GAIRCYLN(k-1) and HGAIRTH(k) in the equation (5a) respectively with GAIRCYLN(k) and HGAIRTHP(k).

$$GAIRCYLP(k) = (1-CGAIRCYLN) \times GAIRCYLN(k) + CGAIRCYLN \times HGAIRTHP(k) \quad (16)$$

As described above, in this embodiment, the estimated throttle valve passing air flow rate HGAIRTH which is a flow rate of fresh air passing through the throttle valve 3, and the predicted throttle valve passing air flow rate HGAIRTHP which is a predicted value of the estimated throttle valve passing air flow rate HGAIRTH are calculated. The cylinder intake air amount GAIRCYLN(k) is calculated by applying the estimated throttle valve passing air flow rate HGAIRTH and the preceding value GAIRCYLN(k-1) of the cylinder intake air amount to the intake pipe model equation. Further, the predicted cylinder intake air amount GAIRCYLP(k) is calculated by applying the predicted throttle valve passing air flow rate HGAIRTHP(k) and the cylinder intake air amount GAIRCYLN(k) to the intake pipe model equation (16). That is, the predicted cylinder intake air amount GAIRCYLP(k) is calculated using the latest value of the calculated cylinder intake air amount GAIRCYLN(k). Accordingly, the predicted cylinder intake air amount GAIRCYLP(k) can be calculated with higher accuracy as compared with the prior art using the preceding value of the predicted cylinder intake air amount.

Further, the theoretical cylinder intake air amount GAIRSTD is calculated based on the intake pressure PBA, the intake air temperature TA, and the cylinder volume Vcyl, the volumetric efficiency ηv is calculated by dividing the preceding calculated value GAIRCYLN(k-1) of the cylinder intake air amount by the theoretical cylinder intake air amount GAIRSTD, and the cylinder intake air amount GAIRCYLN(k) and the predicted cylinder intake air amount GAIRCYLP(k) are calculated by applying the calculated volumetric efficiency ηv to the equations (5a) and (16).

Accordingly, the cylinder intake air amount GAIRCYLN and the predicted cylinder intake air amount GAIRCYLP can be calculated without maps or tables, and accurate values of the cylinder intake air amount GAIRCYLN and the predicted cylinder intake air amount GAIRCYLP can always be obtained without the influence of aging changes in the engine characteristic, since the volumetric efficiency ηv is updated using the equation (7).

In this embodiment, the ECU 5 constitutes the intake air flow rate obtaining means, the intake air flow rate predicting means, the cylinder intake air amount calculating means, the cylinder intake air amount predicting means, and the volumetric efficiency calculating means. That is, the intake air flow rate estimation block 52 and the conversion block 53 shown in FIG. 5 correspond to the intake air flow rate obtaining means, the predicted intake air flow rate calculation block 55 corresponds to the intake air flow rate predicting means, the cylinder intake air amount calculation block 54 corresponds to the cylinder intake air amount calculating means, and the predicted cylinder intake air amount calculation block 56 corresponds to the cylinder intake air amount predicting means.

Second Embodiment

In this embodiment, the calculation of the volumetric efficiency $\eta v$, the delay coefficient CGAIRCYLN, and the cylinder intake air amount GAIRCYLN at discrete time k in the first embodiment is repeated more than once, thereby obtaining a more accurate value of the cylinder intake air amount GAIRCYLN in the transient operating condition of the engine. This embodiment is the same as the first embodiment except for the points described below.

Figure 7:
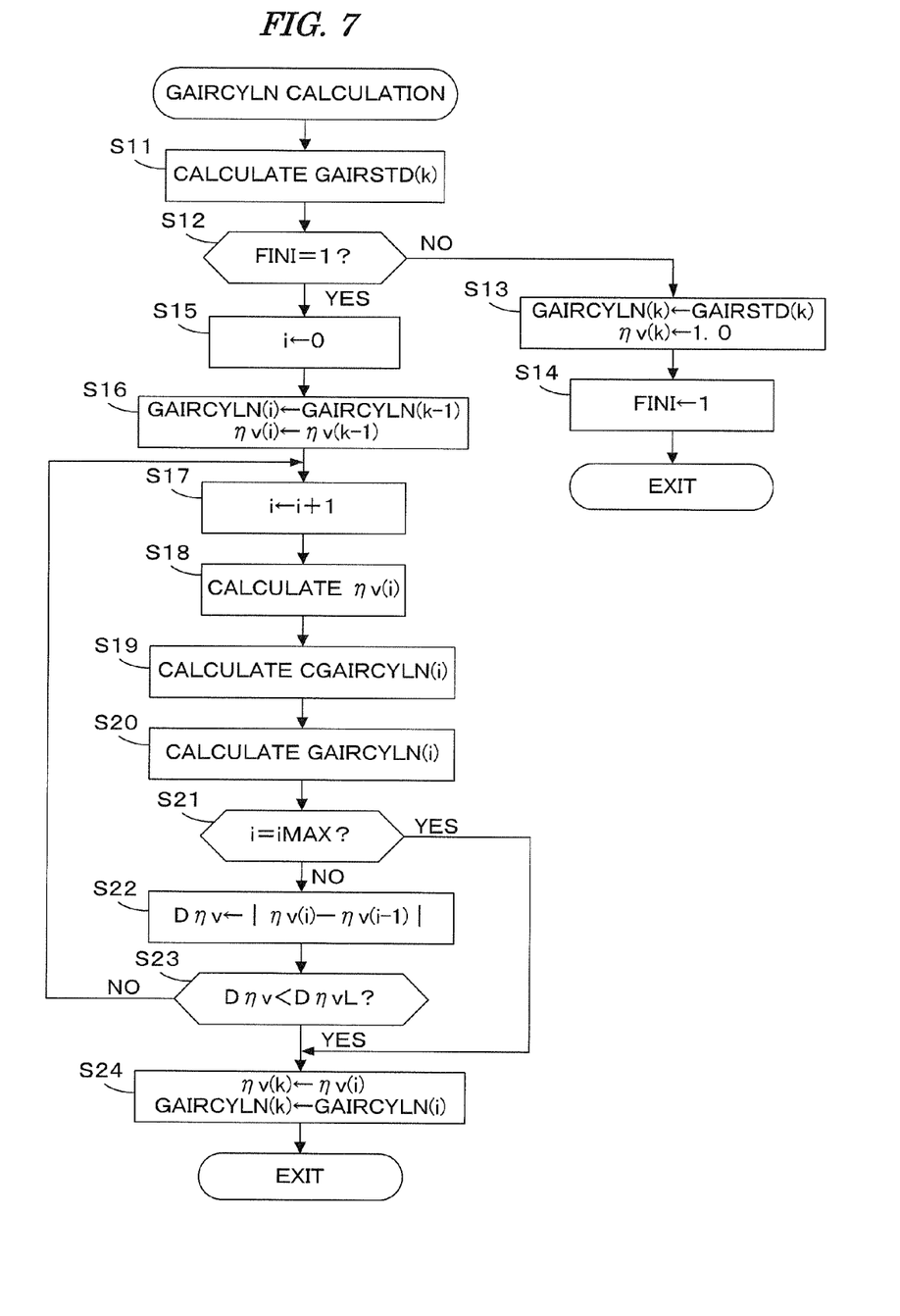
FIG. 7 is a flowchart of the cylinder intake air amount calculating process in a second embodiment of the present invention.

FIG. 7 is a flowchart of the cylinder intake air amount calculation process in this embodiment. This process is executed by the CPU in the ECU 5 at intervals of one stroke period in synchronism with generation of the TDC pulse (at the timing of every 180 degree rotation of the crankshaft if the engine is a 4-cylinder engine).

In step S11, the theoretical cylinder intake air amount GAIRSTD(k) is calculated with the above described equation (8). In step S12, it is determined whether or not an initialization flag FINI is equal to "1". Since the initialization flag FINI is equal to "0" immediately after engine start, the process proceeds to step S13, in which the cylinder intake air amount GAIRCYLN(k) is set to the theoretical cylinder intake air amount GAIRSTD(k), and the volumetric efficiency $\eta v$(k) is set to "1.0". Subsequently, the initialization flag FINI is set to "1" (step S14).

If the initialization flag FINI is equal to "1", the process proceeds from step S12 to step S15, in which an index parameter i for counting a number of execution of the updating calculation is set to "0". In the following explanation, GAIRCYLN(i), $\eta v$ (i), and CGAIRCYLN (i) to which the index parameter i is attached, are respectively referred to as "updated cylinder intake air amount", "updated volumetric efficiency", and "updated delay coefficient".

In step S16, the updated cylinder intake air amount GAIRCYLN(i)(i=0) is set to the preceding value GAIRCYLN(k−1) of the cylinder intake air amount, and the updated volume efficiency $\eta v$ (i)(i=0) is set to the preceding value $\eta v$(k−1) of the volumetric efficiency.

In step S17, the index parameter i is incremented by "1", and the updated volumetric efficiency $\eta v$(i) is calculated by the following equation (7a) in step S18.

$$\eta v(i) = GAIRCYLN(i-1)/GAIRSTD(k) \qquad (7a)$$

In step S19, the updated delay coefficient CGAIRCYLN(i) is calculated by the following equation (6a).

$$CGAIRCYLN(i) = Vcyl \times \eta v(i)/Vin \qquad (6a)$$

In step S20, the updated cylinder intake air amount GAIRCYLN(i) is calculated by the following equation (5b).

$$GAIRCYLN(i) = (1-CGAIRCYLN(i)) \times GAIRCYLN(i-1) + CGAIRCYLN(i) \times HGAIRTH(k) \qquad (5b)$$

In step S21, it is determined whether or not the index parameter i reached the maximum value iMAX. In this embodiment, the maximum value iMAX is set to a value which is equal to or greater than "2" according to the processing performance (computing speed) of the CPU. Since the answer to step S21 is initially negative (NO), the process proceeds to step S22, in which a volumetric efficiency change amount D$\eta v$ is calculated by the following equation (21).

$$D\eta v = |\eta v(i) - \eta v(i-1)| \qquad (21)$$

In step S23, it is determined whether or not the volumetric efficiency change amount D$\eta v$ is less than a predetermined threshold value D$\eta v$L. If the answer to step S23 is negative (NO), the process returns to step S17, and calculation of the updated volume efficiency $\eta v$(i) and the updated cylinder intake air amount GAIRCYLN(i) is again executed in steps S17-S20.

If the answer to step S21 or S23 is affirmative (YES), the process proceeds to step S24, in which the volumetric efficiency $\eta v$(k) and the cylinder intake air amount GAIRCYLN (k) are respectively set to the updated volumetric efficiency $\eta v$(i) and the updated cylinder intake air amount GAIRCYLN (i) at the time.

Figure 8:
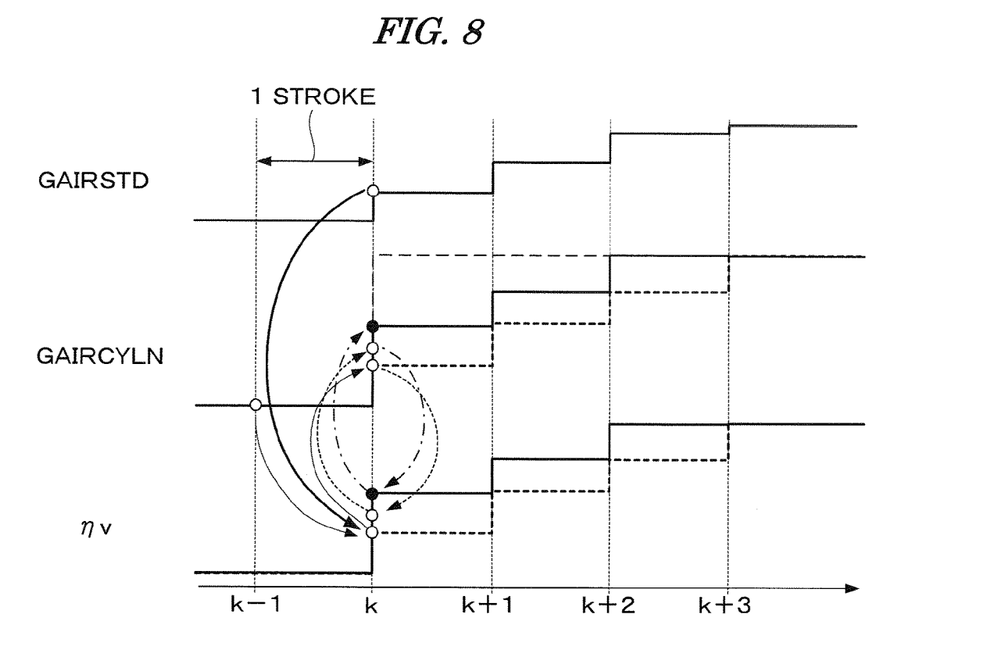
FIG. 8 is a time chart for illustrating the process of FIG. 7.

FIG. 8 is a time chart for illustrating the process of FIG. 7, showing changes in the theoretical cylinder intake air amount GAIRSTD, the cylinder intake air amount GAIRCYLN, and the volumetric efficiency $\eta v$ in the transient state wherein the cylinder intake air amount GAIRCYLN is increasing. The dashed lines indicative of changes in the cylinder intake air amount GAIRCYLN and the volumetric efficiency $\eta v$ correspond to the calculation method of the first embodiment, and the solid lines correspond to the calculation method of this embodiment.

In the calculation at time k, the arrows of thin solid lines indicate the calculation of i=1, the arrows of dashed lines indicate the calculation of i=2, and the arrows of chain lines indicate the calculation of i=3. FIG. 8 shows an example in which the updating calculation is executed until the index parameter i reaches "3" at time k. In this example, the similar updating calculations are also executed at times (k+1) and (k+2) (not shown in FIG. 8), and the cylinder intake air amount GAIRCYLN in the steady state can be obtained at time (k+2). Thus, by executing the updating calculation, more accurate values of the volumetric efficiency $\eta v$ and the cylinder intake air amount GAIRCYLN in the transient operating condition can be obtained.

Further, the updating calculation is terminated when the volumetric efficiency change amount D$\eta v$ becomes less than the predetermined threshold value D$\eta v$L even before the index parameter i reaches the maximum value iMAX. Therefore, the updating calculation can be terminated at an appropriate timing.

In this embodiment, steps S12-S24 of FIG. 7 correspond to the volumetric efficiency calculating means and the cylinder intake air amount calculating means.

Modification 1

Figure 9:
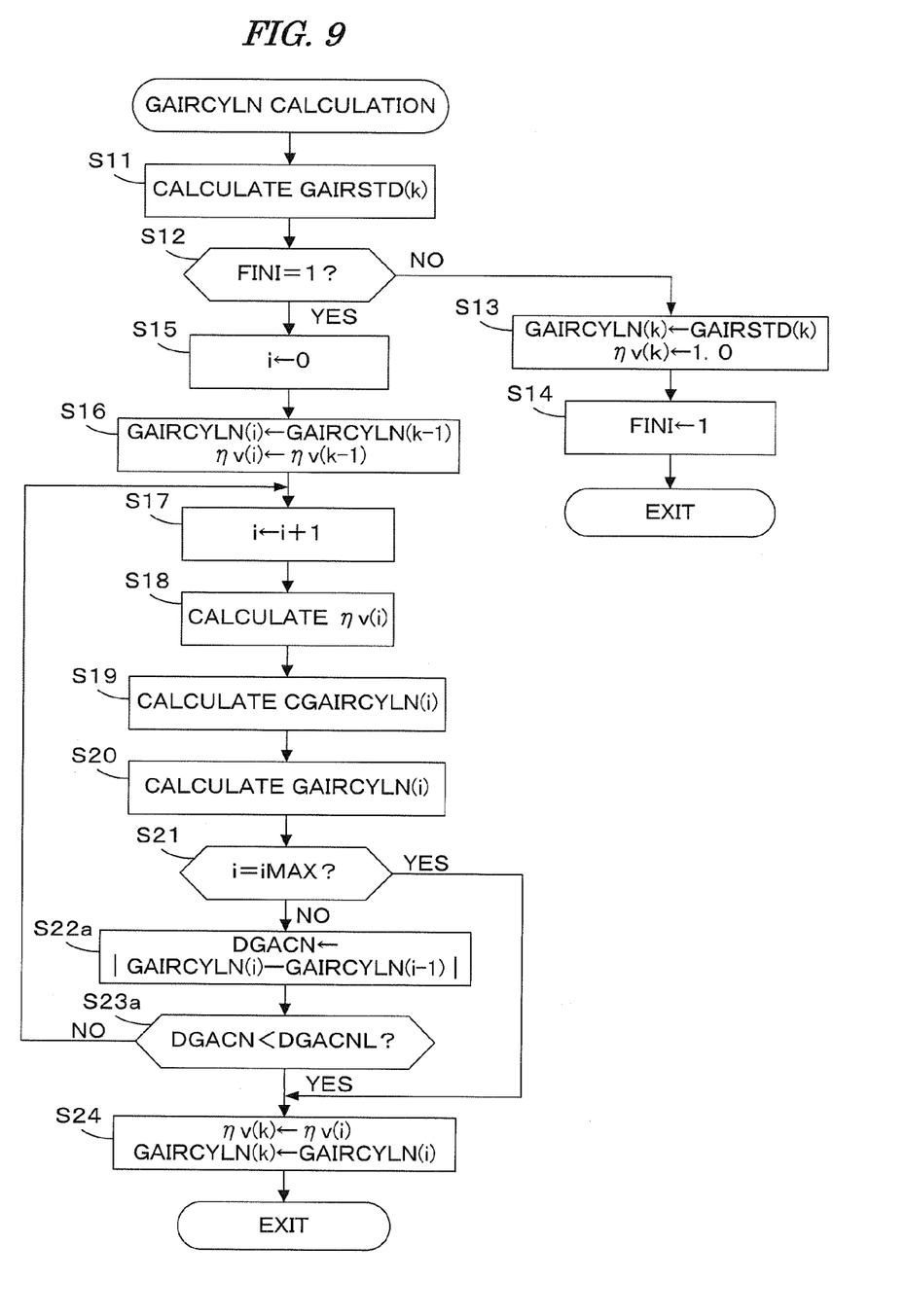
FIG. 9 is a flowchart of a modification of the process of FIG. 7.

FIG. 9 is a flow chart showing a modification of the process of FIG. 7. The process of FIG. 9 is obtained by changing steps S22 and S23 of FIG. 7 respectively to steps S22a and S23a. In step S22a, a cylinder intake air amount change amount DGACN is calculated by the following equation (22).

$$DGACN = |GAIRCYLN(i) - GAIRCYLN(i-1)| \qquad (22)$$

In step S23a, it determined whether or not the cylinder intake air amount change amount DGACN is less than a predetermined threshold value DGACNL. While the answer to step S23a is negative (NO), the process returns to step S17. If the answer to step S23a is affirmative (YES), the process proceeds to step S24.

In this modification, the updating calculation ends when the cylinder intake air amount change amount DGACN becomes less than the predetermined threshold value DGACNL even before the index parameter i reaches the maximum value iMAX.

Modification 2

Steps S22 and S23 of FIG. 7 may be deleted, and the process may immediately return to step S17 if the answer to step S21 is negative (NO). In this modification, the updating calculation is always executed until the index parameter i reaches the maximum value iMAX.

The present invention is not limited to the embodiments described above, and various modifications may be made. For example, in the above described embodiments, the estimated intake air flow rate HGAIR is calculated using the atmospheric pressure PA detected by the atmospheric pressure sensor 33. Alternatively, the estimated intake air flow rate HGAIR may be calculated using the estimated atmospheric pressure HPA calculated using a well known atmospheric pressure estimation method (for example, refer to the U.S. Pat. No. 6,016,460).

Further in the above described embodiments, the estimated throttle valve passing air flow rate HGAIRTH is used in calculating the cylinder intake air amount GAIRCYLN and the predicted cylinder intake air amount GAIRCYLP. Alternatively, the detected throttle valve passing air flow rate GAIRTH which is obtained by converting the detected intake air flow rate GAIR to a flow rate per every stroke of the engine.

Further in the above described embodiments, the example in which the present invention applied to a gasoline internal combustion engine is shown. The present invention is applicable also to a diesel internal combustion engine. Further, the present invention can also be applied to a watercraft propulsion engine, such as an outboard engine having a vertically extending crankshaft.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A cylinder intake air amount calculating apparatus for an internal combustion engine which calculates a cylinder intake air amount which is an amount of fresh air sucked in a cylinder of said engine using an intake air pipe model equation which is obtained by modeling an intake pipe of said engine, said cylinder intake air amount calculating apparatus comprising:
   intake air flow rate obtaining means for obtaining an intake air flow rate which is a flow rate of fresh air passing through the intake pipe of said engine;
   cylinder intake air amount calculating means for calculating a present value of the cylinder intake air amount by applying the intake air flow rate and a preceding value of the cylinder intake air amount to the intake pipe model equation;
   intake air flow rate predicting means for calculating a predicted intake air flow rate which is a predicted value of the intake air flow rate;
   cylinder intake air amount predicting means for calculating a predicted cylinder intake air amount which is a predicted value of the cylinder intake air amount by applying the predicted intake air flow rate and the present value of the cylinder intake air amount calculated by the cylinder intake air amount calculating means to the intake pipe model equation without correcting the present value; and
   volumetric efficiency calculating means for calculating a volumetric efficiency of said engine using the preceding value of the cylinder intake air amount, wherein the intake pipe model equation includes the volumetric efficiency.

2. A cylinder intake air amount calculating apparatus according to claim 1, wherein said volumetric efficiency calculating means more than once updates the volumetric efficiency using the cylinder intake air amount calculated by said cylinder intake air amount calculating means, as the preceding value, and said cylinder intake air amount calculating means more than once updates the cylinder intake air amount using the updated volumetric efficiency.

3. A cylinder intake air amount calculating apparatus according to claim 2, wherein said volumetric efficiency calculating means and said cylinder intake air amount calculating means respectively update the volumetric efficiency and the cylinder intake air amount by a predetermined number of times (iMAX).

4. A cylinder intake air amount calculating apparatus according to claim 2, wherein said volumetric efficiency calculating means and said cylinder intake air amount calculating means respectively update the volumetric efficiency and the cylinder intake air amount until a difference ($D\eta v$) between a preceding value and an updated value of the volumetric efficiency reaches a value less than a first predetermined amount ($D\eta vL$), or until a difference (DGACN) between a preceding value and an updated value of the cylinder intake air amount reaches a value less than a second predetermined amount (DGACNL).

5. A cylinder intake air amount calculating method for an internal combustion engine which calculates a cylinder intake air amount which is an amount of fresh air sucked in a cylinder of said engine using an intake air pipe model equation which is obtained by modeling an intake pipe of said engine, said cylinder intake air amount calculating method comprising the steps of:
   a) obtaining an intake air flow rate which is a flow rate of fresh air passing through the intake pipe of said engine;
   b) calculating a present value of the cylinder intake air amount by applying the intake air flow rate and a preceding value of the cylinder intake air amount to the intake pipe model equation;
   c) calculating a predicted intake air flow rate which is a predicted value of the intake air flow rate;
   d) calculating a predicted cylinder intake air amount which is a predicted value of the cylinder intake air amount by applying the predicted intake air flow rate and the present value of the cylinder intake air amount calculated in step b) to the intake pipe model equation without correcting the present value; and
   e) calculating a volumetric efficiency of said engine using the preceding value of the cylinder intake air amount, wherein the intake pipe model equation includes the volumetric efficiency.

6. A cylinder intake air amount calculating method according to claim 5, wherein the volumetric efficiency is more than once updated in said step e) using the cylinder intake air amount calculated in said step b), as the preceding value, and the cylinder intake air amount is more than once updated in said step b) using the updated volumetric efficiency.

7. A cylinder intake air amount calculating method according to claim 6, wherein the volumetric efficiency and the update of the cylinder intake air amount are respectively updated by a predetermined number of times.

8. A cylinder intake air amount calculating method according to claim 6, wherein the volumetric efficiency and the cylinder intake air amount are respectively updated until a difference between a preceding value and an updated value of the volumetric efficiency reaches a value less than a first predetermined amount, or until a difference between a preceding value and an updated value of the cylinder intake air amount reaches a value less than a second predetermined amount.

* * * * *